No. 642,521. Patented Jan. 30, 1900.
E. T. GREENFIELD.
JUNCTION BOX FOR ELECTRICAL CONDUCTORS.
(Application filed Dec. 18, 1899.)

(No Model.)

Witnesses
Edward B. Rowland
M. F. Keating

Inventor
Edwin T. Greenfield
Charles J. Kintner
By his Attorney

THE NORRIS PETERS CO., PHOTO-LITHO., WASHINGTON, D. C.

UNITED STATES PATENT OFFICE.

EDWIN T. GREENFIELD, OF NEW YORK, N. Y.

JUNCTION-BOX FOR ELECTRICAL CONDUCTORS.

SPECIFICATION forming part of Letters Patent No. 642,521, dated January 30, 1900.

Application filed December 18, 1899. Serial No. 740,684. (No model.)

*To all whom it may concern:*

Be it known that I, EDWIN T. GREENFIELD, a citizen of the United States, residing at New York, borough of Manhattan, county and State of New York, have made a new and useful Invention in Junction-Boxes for Electrical Conductors, of which the following is a specification.

My invention has for its object to provide a simple, cheap, and efficient junction-box which is so constructed that it may be adapted for use in connection with any number of inleading conduits and inclosed conductors, and will be fully understood by referring to the accompanying drawings, in which—

Figure 1:
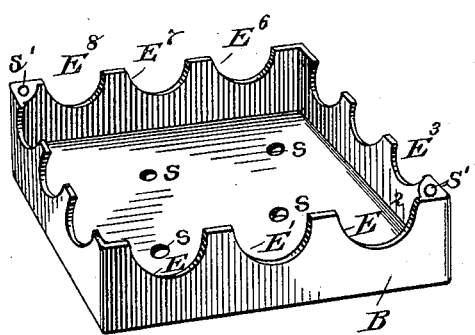
Figure 2:
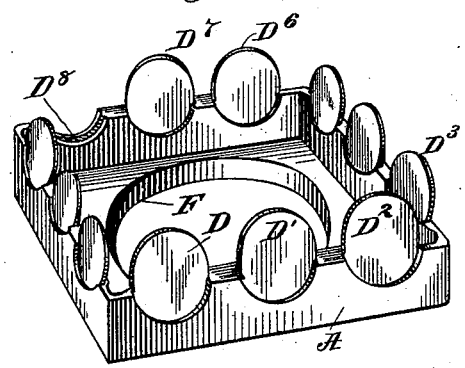
Figure 3:
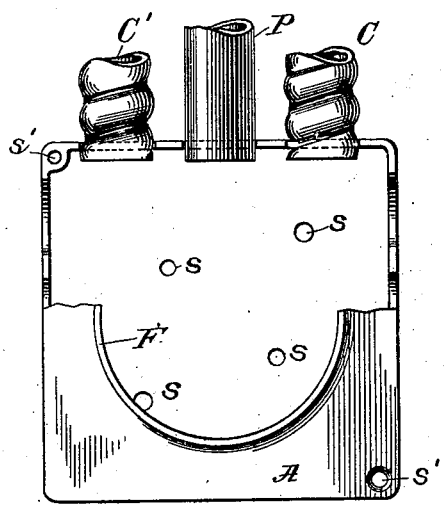
Figure 4:
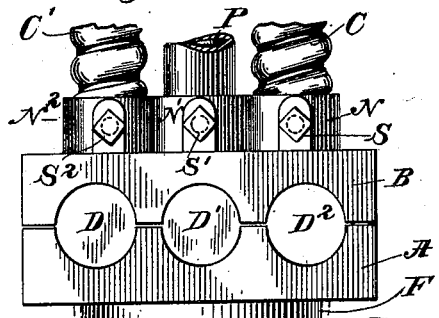

Figure 1 is a perspective view of the bottom of my improved box, and Fig. 2 is a similar perspective view of the detachable top thereof shown bottom side up. Fig. 3 is a side elevational view of a complete box, the top thereof being partly broken away to better illustrate the relation of the inleading conduits and an intervening gas-pipe on one side thereof. Fig. 4 is a side elevational view of a modified form of the invention as applicable to ceiling-fixtures.

In the wiring of buildings for electrical illumination, transmission of power, &c., there are many conditions which necessitate the use of individual junction-boxes constructed especially for such individual uses.

My invention contemplates the constructing by casting or otherwise of a junction-box in such manner that the box may be adapted to the peculiar conditions arising—that is to say, if there is to be one, two, or any number of inleading conduits or pipes my improved junction-box is so constructed that it may be adapted therefor and put in place by the workman as the conditions arise.

Referring now to the drawings in detail, B represents the base of my novel junction-box, which is made preferably of cast-iron, having screw-holes $s\,s$ for securing it to a side wall before the plaster is put in place. This base is provided in its lateral edges with any number of half-circular openings E E' $E^2$ $E^3$, &c., there being shown in the present instance three such openings on each side. A represents the cap or cover of the junction-box, which is made also of cast-iron, with an enlarged opening having a rim or flange on its outer face for receiving the fixture.

D D' $D^2$ $D^3$, &c., represent circular disks cast integral with the part A, said disks being slightly elliptical and adapted when the two parts of the junction-box are put together to completely close the half-circular openings E E' $E^2$, &c., by sliding past their inner faces. These disks D D' $D^2$ $D^3$, &c., are very much thinner than are the walls of the part A, so as to enable a workman to break any number of them out with a pair of pincers or a hammer, one of said disks $D^8$ being shown as thus broken out in Fig. 2.

In Fig. 3 I have illustrated the manner of utilizing the hereinbefore-described junction-box, showing in that figure the application of said box in connection with a gas-pipe P and two inleading flexible metallic-armored conduits C C', the ends of which pass through the openings $E^6$ $E^7$ $E^8$. In order to adapt my novel form of junction-box for use in connection with this particular arrangement of conduits or gas-pipe, I take a pair of pincers and break out certain of the disks—in this instance $D^6$ $D^7$, &c., corresponding to the openings $E^6$, $E^7$, and $E^8$—thereby constituting when the two parts of the box are put together complete circular openings for the conduits C C' and the gas-pipe P. The two parts of the box are put together, as illustrated in Fig. 3, with the disks D D' $D^2$, &c., closing the corresponding half-circular openings E E' $E^2$, &c., of the base of the box, after which the cap is secured by screws $s'\,s'$, thus causing a binding action upon the inleading ends of the conduits C C' and pipe P. The complete box is secured to the face of the wall by screws passing through the holes $s\,s\,s$, and the plaster is then put in place upon the wall, covering the conduits and the lower portion of the junction-box, and the necessary electrical connections are made in the box and the fixture secured to the rim F in the usual way.

In Fig. 4 I have illustrated the invention as applicable particularly to ceiling-fixtures, and also as showing a form of the box which may be applied either to a ceiling or to a wall, wherever a gas-pipe passes therethrough, without the use of ceiling-blocks or wall-blocks or other means of attachment such as are now ordinarily used, the connection of the box being effected by securing the bottom thereof to the end of a gas-pipe by a set-screw, as will be explained. B is of the same structure as the like base in Fig. 1, except that in place of the screw-holes $s\ s$, Figs. 1 and 3, this base is provided with integral upwardly-extending hollow necks N N' N², having screw-holes adapted to receive set-screws S S' S². The base B is secured to the ceiling by passing it upward over the ends of the downwardly-extending conduits C C' and gas-pipe P, after which the set-screws S S' S² are caused to firmly grip the inner ends of the conduits C C' and pipe P, said pipe acting as a means for suspending the box. The lower half of the junction-box is then put in place, so that the disks D D' D², &c., cover the corresponding half-circular openings E E' E², &c. The fixture F' is then secured to the downwardly-extending rim F in the usual way.

Having thus described my invention, what I claim, and desire to secure by Letters Patent of the United States, is—

1. A junction-box composed of two parts one of which is provided with openings and the other with corresponding disks adapted to close said openings, when the two parts of the box are put together, substantially as described.

2. A junction-box composed of two parts one of which is provided with openings and the other with corresponding disks integral with the walls thereof, said disks being of thinner material than the walls, the arrangement being such that certain of said disks may be broken down or out, so that when the parts are put together there is a definite number of openings for the admission of the ends of conduits into the box, the remaining disks closing corresponding openings, substantially as described.

3. A cast-metal junction-box composed of two parts, one of said parts having half-circular openings in its walls and the other corresponding disks integral therewith and adapted to close the openings of the first-named part when the two are secured together, substantially as described.

4. A junction-box having its walls so constructed that they may be broken down or out at definite points for the admission of the ends of the conduits or pipes, said junction-box being provided with upwardly-extending hollow necks and set-screws for securing the ends of inleading conduits or pipes, substantially as described.

5. A metallic junction-box composed of two parts, one of which is provided with means for securing it in a fixed position, and openings in its lateral walls; in combination with a cap or cover provided with disks integral therewith for closing said openings, said disks being adapted to be broken down or out at will for the admission of the ends of conduits or pipes, substantially as described.

6. A two-part junction-box for electrical conductors, one part of which is provided with hollow necks for receiving the incoming ends of a gas-pipe and one or more electrical conduits; in combination with set-screws adapted to secure the box to the gas-pipe and conduits, substantially as described.

In testimony whereof I have hereunto subscribed my name this 15th day of December, 1899.

EDWIN T. GREENFIELD.

Witnesses:
 WM. T. RUETE,
 C. J. KINTNER.